Oct. 11, 1966  R. J. LEYENDECKER  3,278,164
FENCE RAISING MEANS
Filed Dec. 31, 1964  2 Sheets-Sheet 2
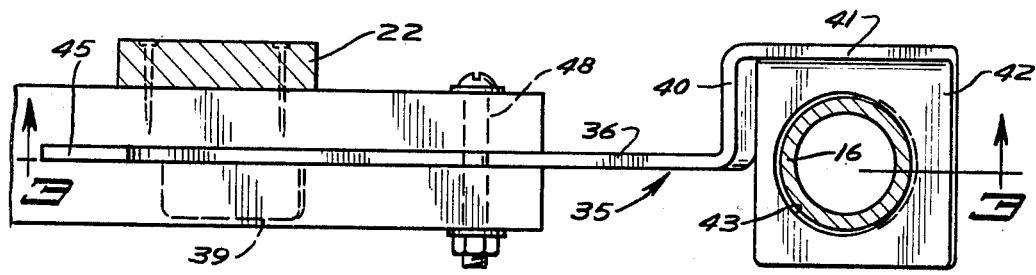
FIG. 2
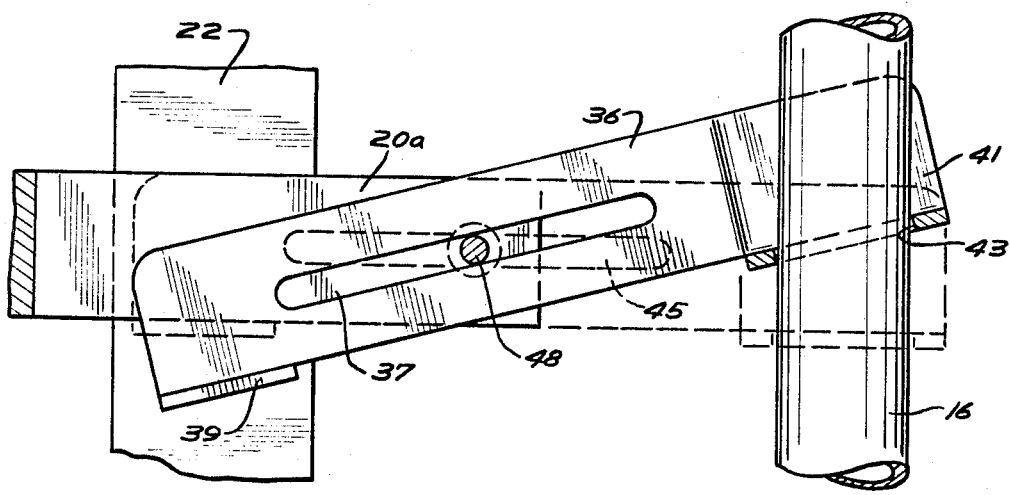
FIG. 3
FIG. 4
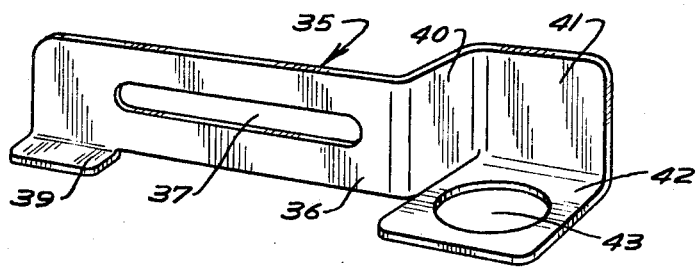
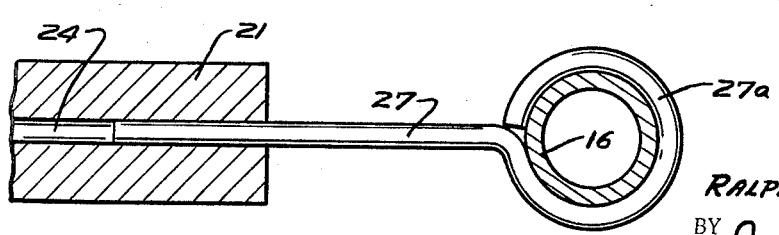
FIG. 5
INVENTOR.
RALPH J. LEYENDECKER
BY
ATTORNEYS

United States Patent Office 3,278,164
Patented Oct. 11, 1966

3,278,164
FENCE RAISING MEANS
Ralph J. Leyendecker, 408 E. Broadway St., Osseo, Minn.
Filed Dec. 31, 1964, Ser. No. 422,835
1 Claim. (Cl. 256—24)

This invention relates to improvement in apparatus for raising fence sections.

It is desirable to have means for raising fence sections from time to time for various purposes. In a particular instance, it is desirable to raise fence sections in trimming or mowing grass to mow the grass directly under the lines of the fence and in the areas closely adjacent the sides of the fence.

It is an object of this invention therefore to provide simple and effective means for readily raising fence sections. Particular reference is had here to rigid fence sections.

It is another object of this invention to provide an apparatus carried at either end of a rigid fence section which cooperates with adjacent fence posts for releasingly raising said fence section.

It is more specifically an object of this invention to provide an apparatus comprising a self adjusting bracket at either end of a fence section cooperating with adjacent fence posts to ride up and down said posts to releasingly hold said fence section in a raised position.

These and other objects and advantages of the invention will be set forth in the following description made in connection with the accompanying drawings in which like reference characters refer to similar parts throughout the several views and in which:

FIG. 2 is a view in horizontal section on an enlarged scale taken on line 2—2 of FIG. 1 as indicated;

FIG. 3 is a view in vertical longitudinal section taken on line 3—3 of FIG. 2 as indicated;

FIG. 4 is a perspective view on a somewhat reduced scale showing the bracket portion of the apparatus herein; and FIG. 5 is a broken view in horizontal section on a somewhat enlarged scale taken on line 5—5 of FIG. 1 as indicated.

Figure 1:
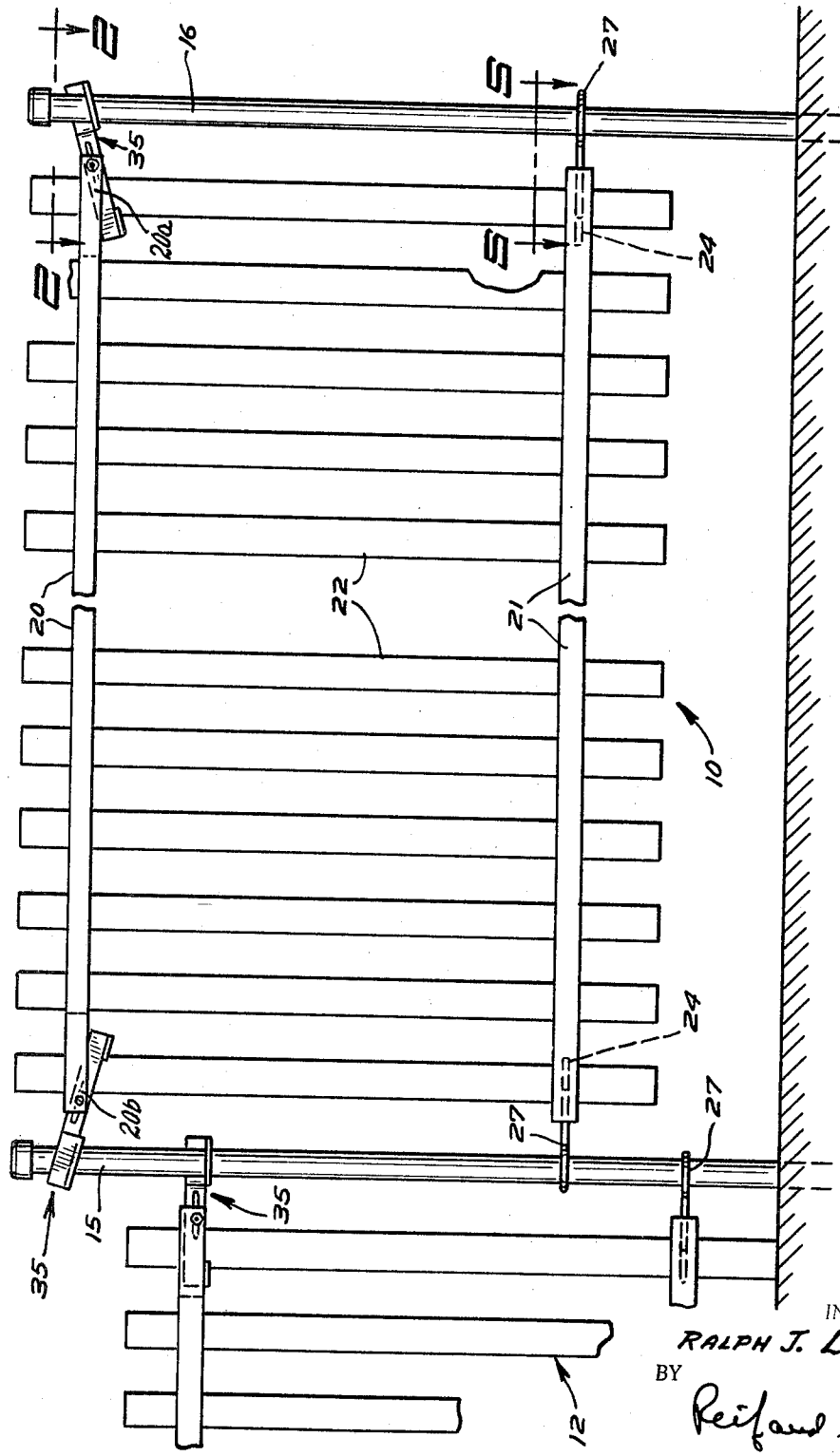
FIG. 1 is a broken view in front elevation showing the apparatus herein in operating position.

Referring to the drawings, a fence section in broken view is shown in FIG. 1 being indicated generally by the numeral 10. A partial fence section 12 is shown in connection therewith, and it will be of identical construction. Supporting said fence sections are posts 15 and 16 here indicated as being tubular in form.

Said fence section 10 may be variousely formed as to the details of its construction. It is here shown in what may be regarded as a conventional design with specific modification as will be described in connection with the invention herein. Said fence section 10 is shown comprising a top rail 20, a bottom rail 21, and spaced vertically disposed slats 22 secured thereto.

Fence section 12 is shown in a normal ground engaging position. Said fence section 10 is shown in a raised position as will hereinafter be described.

With reference to the bottom rail 21 of said fence section 10, longitudinal sockets 24 and 25 are shown extending inwardly longiutdinally of the end portions of said rail. Slideably disposed within said sockets are eyebolts 27 having eye portions 27a of sufficient size to be freely slideably disposed over said posts 15 and 16.

With reference to FIGS. 2-4, a bracket 35 is shown. Said bracket within the scope of the invention herein and to perform the function to be described may take various specific forms. In the embodiment of the invention here disclosed, said bracket is shown conventionally formed of plate like or strap material in a die cutting and forming operation comprising an elongated vertically disposed body portion 36 having a longitudinally extending slot 37 therein and having at its rear end portion a transversely extending right angled flange portion 39 forming an underlying stop as will be described.

A forward end portion of said body portion 36 of said bracket 35 is right angled laterally to form a step portion 40 which in turn is angled to provide a forwardly extending portion 41. Said forwardly extending portion 41 in blank form in provided with a lateral elongated or depending plate portion 42 which is angled upwardly into a plane normal to the plane of said body portion 36 or unto a horizontal operating position as illustrated. Said plate portion 42 has an aperture 43 therein somewhat larger in its cross sectional dimension than the cross sectional dimension of said posts 15 and 16 to slide freely on said posts. It will be understood that both said aperture and said posts may be non-circular in cross section.

Formed in the end portion 20a of said rail 20 is a vertically disposed open sided open ended slot 45 adapted to slideably receive therein said slotted body portion 36 of said bracket 35 and with the stop 39 of said bracket underlying the adjacent portion of the bottom of said rail. Disposed transversely through said end 20a of said rail is a nutted bolt 48 forming a pivot and extending through said slots 45 and 37 of said rail and said bracket respectively and serving as a retaining member for said bracket. Thus it is seen that said bracket 35 is pivoted to said rail 20 for movement freely axially of said pivot and for adjustment longitudinally of said rail.

A second bracket 35 is pivoted to the end portion 20b of said rail 20 as above described and is slideably mounted onto the post 15.

In like manner the fence section 12 will be equipped with brackets 35 and eyebolts 27.

OPERATION

The invention herein embodies the idea of having a fence made up of a plurality of sections of 8, 10 or 12 feet lengths or longer if desired depending upon the weight of a fence section and the ease with which it can be handled. It is desirable to raise each fence section from 6 to 10 inches to provide sufficient clearance to permit a lawn mover to pass under the fence sufficiently to trim the grass thereunder and at either side thereof.

The invention herein serves two purposes. It provides a convenient means for installing a fence in sections and provides further means for readily raising or elevating the fence by sections.

The apertured portion of the bracket 35 of itself does not embody a new concept as to its engagement with a rod or with a post.

The novelty and improvement in this structure is present in adapting the bracket to a fence section in combination with adjacent fence posts. There must be provided sufficient leeway to avoid binding and to permit a freely slideable action. The aperture 43 of the bracket portion 42 slides freely on the fence post so long as the bracket portion 42 is disposed in a plane substantially normal to the axis of the fence post, but when said bracket portion is angled relative to the axis of the fence post with the body portion 36 of the bracket being angled downwardly and bearing some load, then frictional engagement develops between the periphery of the aperture 43 and the surface of the fence post. There is sufficient frictional engagement present to support the weight of a fence section.

The bracket 35 is attached to the end of a fence section as described to permit a ready and free vertical swinging movement thereof. It is noted that the bracket has free longitudinal movement or radial movement relative to the pivot 48 and free pivotal movement as well. Thus there is no binding effect present with regard to the bracket in conection with the fence section and the adjacent fence post. Thus in raising a fence section the brackets 35 ride upwardly readily on their respective fence posts.

An entire fence section may be raised as a unit or the end portions thereof may be raised in turn. In raising a fence section, it will be raised higher than the point of engagement of the bracket 35 with the adjacent fence post. When the bracket has been raised on the post to a sufficient height for elevation of the fence, the fence is simple dropped. The bracket 35 will become angled as indicated in FIG. 1 in connection with the fence section 10 and as illustrated by the detail shown in FIG. 3. With the bracket in this position frictional engagement will develop between the periphery of the aperture 43 and the surface of the fence post extending therethrough. The fence section is thus supported in an elevated position above ground level. The fence posts will be of sufficient height to provide for the elevation of the fence. The eyebolts 27 slide freely on the fence posts and serve as guide members.

When the first fence section has been raised as above indicated, successive sections of fence are raised in like manner. It will be noted that the last fence section installed will be the first fence section to be raised. It is quite obvious that in lieu of raising successive fence sections, the fence sections may be installed to permit the raising of alternate pairs of fence section. The specific arrangement becomes a matter of preference.

To drop the fence sections to ground engaging positions, the fence sections are raised just sufficiently to remove the load from the brackets and the brackets will then slide downwardly freely on the fence posts and the fence sections are simply dropped to ground engagement.

Thus it is seen that I have provided a very simple construction of a bracket particualrly arranged in connection with a sufficiently rigid fence section to permit a very easy means for raising and lowering fence sections. The invention herein has proved very successful in operation.

It will of course be understood that various changes may be made in the form, details, arrangement and proportions of the parts, without departing from the scope of applicant's invention which, generally stated, consists in a device capable of carrying out the objects above set forth, in the parts and combinations of parts disclosed and defined in the appended claim.

What is claimed is:

A fence raising apparatus in connection with a rigid rail fence section disposed between a pair of spaced fence posts having in combination,
- a first bracket member in connection with one of said fence posts, said bracket member having a horizontal base plate portion having an aperture therein of such size as to freely receive one of said fence posts therethrough,
- a plate portion of said bracket extending forwardly of said base plate portion and being disposed in a vertical plane, said plate portion having a longitudinal slot therein,
- a second bracket member of the structure of said first bracket member in connection with the other of said fence posts, the plate portions of said brackets extending in a direction towards one another,
- the end portions of a rail of said fence section respectively having elongated vertically disposed open-ended slots therein to respectively receive said extended plate portions therein,
- pivots respectively disposed transversely through said rail adjacent each end thereof extending through the respective slots in said rail and said slotted extended plate portions therein for longitudinal adjustment of said bracket members with respect to said fence section, and
- said bracket members being vertically tiltable on said posts for frictional support of said fence section thereon.

References Cited by the Examiner
UNITED STATES PATENTS

| 82,075 | 9/1868 | Bonney | 39—81 |
| 133,528 | 12/1872 | Gorr | 256—65 |
| 462,412 | 11/1891 | Poindexter | 256—65 |
| 1,632,231 | 6/1927 | Holtz | 256—23 |
| 1,656,024 | 1/1928 | Stewart | 256—65 |
| 2,073,947 | 3/1937 | Sander | 256—24 |

HARRISON R. MOSELEY, *Primary Examiner.*

D. L. TAYLOR, *Assistant Examiner.*